J. V. PUGH.
DETACHABLE WHEEL.
APPLICATION FILED JULY 19, 1912.
1,304,510.
Patented May 20, 1919.
2 SHEETS—SHEET 1.
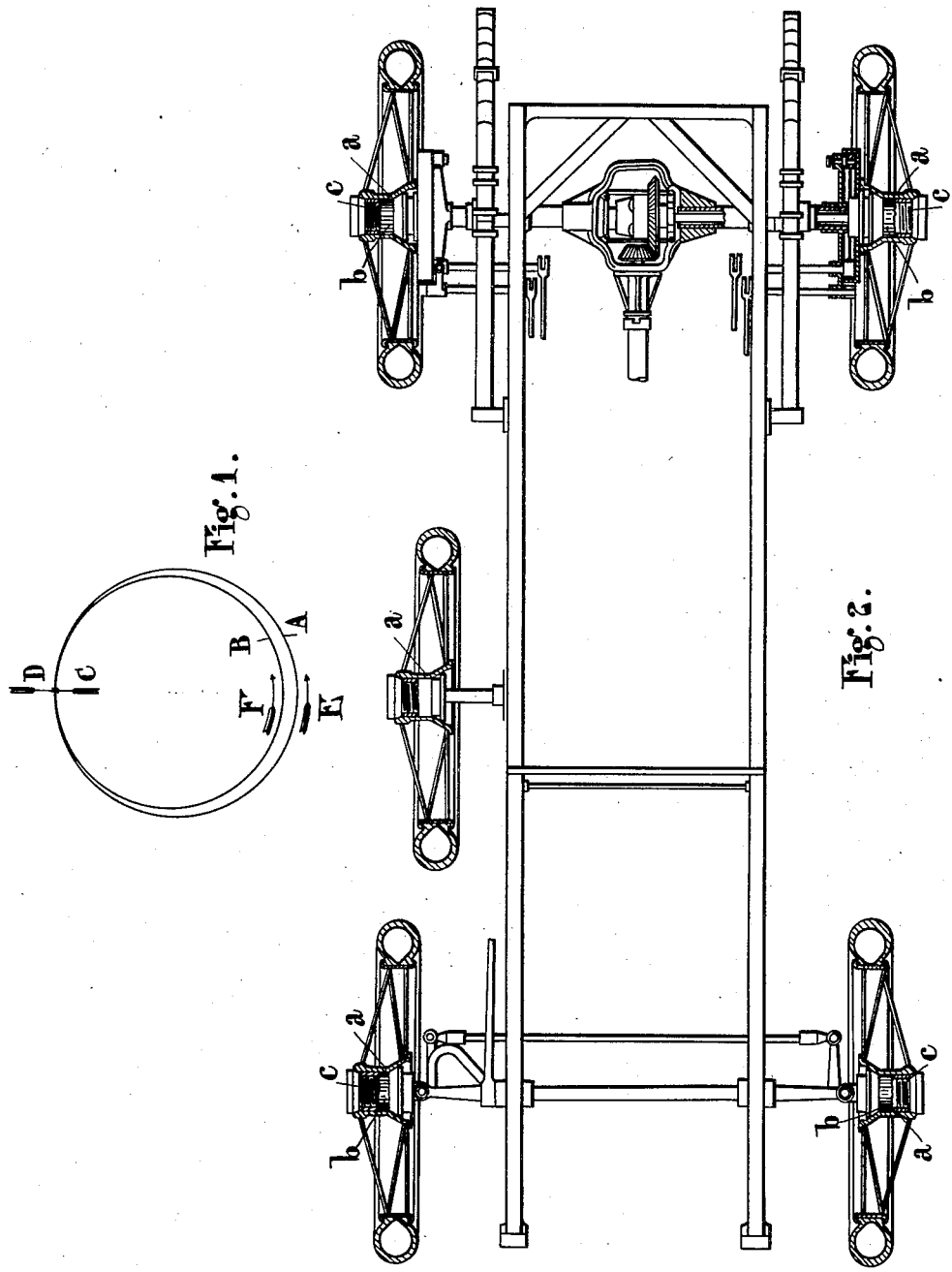
Witnesses.
H. M. Barrett
H. L. Alden
Inventor.
John V. Pugh
By Spear, Middleton, Donaldson & Spear
Attorneys.

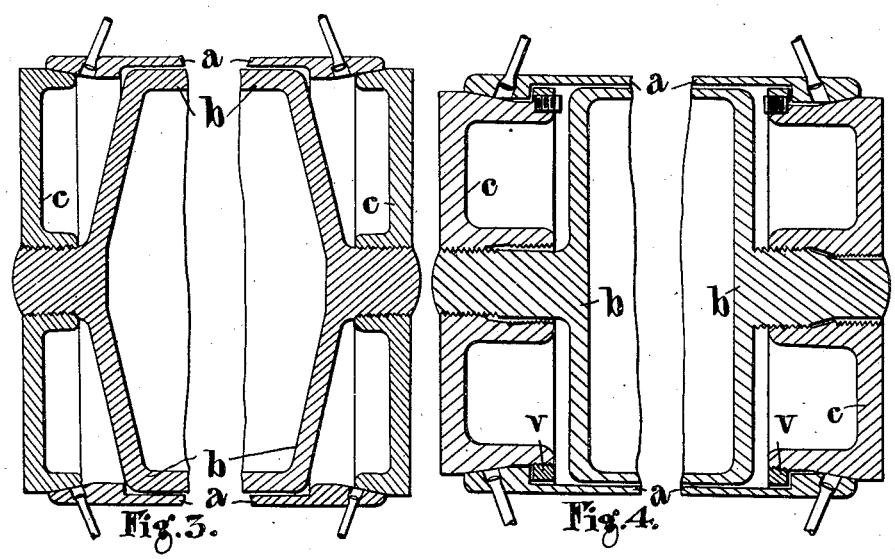

UNITED STATES PATENT OFFICE.

JOHN VERNON PUGH, OF COVENTRY, ENGLAND, ASSIGNOR, BY MESNE ASSIGNMENTS, TO WIRE WHEEL CORPORATION OF AMERICA, A CORPORATION OF NEW YORK.

DETACHABLE WHEEL.

1,304,510.     Specification of Letters Patent.     Patented May 20, 1919.

Application filed July 19, 1912. Serial No. 710,481.

*To all whom it may concern:*

Be it known that I, JOHN VERNON PUGH, a subject of the King of Great Britain and Ireland, residing at Guiting House, Allesley, Coventry, in the county of Warwick, England, have invented certain new and useful Improvements in and Relating to Detachable Wheels, of which the following is a specification.

This invention relates to fitting vehicles with detachable wheels of the type in which an outer or detachable hub part is mounted upon and so as to rotate in common with an inner or permanent hub part, being secured thereon by means of a nut or equivalent screwed securing device.

The object of the invention is to render the secure locking of this nut or screwed securing device which holds the outer upon the inner hub part independent of the action of the ratchets or other additional locking devices, which have hitherto been regarded as essential in practice to insure safety.

It is well known that if two solids of revolution cylinders, cones, screw-threaded cylinders or the like are put together one inside the other the inner one must be smaller in diameter than the outer one, and consequently must be of shorter circumference, and that further when the two parts are in contact with each other at one fixed point and substantially out of contact at the diametrically opposite fixed point, and when either of the two parts be revolved under conditions which do not involve slip, the other part will revolve also, and the speeds of revolution of the two parts will be proportional inversely to the relative lengths of their circumferences, the inner part revolving faster than the outer part.

The two hub parts of a wheel of the type hereinbefore indicated are connected with one another so that they must rotate together and the clearance between them required to insure easy attachment and removal of the detachable part is such that when loaded, the one hub part may be considered to be slightly eccentric to the other.

The nut or securing device is arranged when screwed up to center the outer end and to transmit a portion of the load from the inner to the outer hub part, and a moderately coned or tapered centering abutment is preferably provided conveniently at the inner end of the hub.

The above transmission of load produces during forward rotation of the wheels the conditions necessary for the already described principle to come into action, and thus by the contact of the suitable co-acting surfaces is caused constantly to screw up and to tighten the nut or securing device and consequently to retain the detachable wheel part in position.

The invention consists in applying the foregoing principle so as to obtain an automatic retention of detachable wheels on both sides of a vehicle as the result of the forces transmitted from one hub part to the other by the securing device during forward movement of the vehicle.

The invention further consists in a nut fitting the inner and outer hub parts and engaging on a screw thread on one of them so arranged that the two hub parts have opposite rotative actions on the nut, but the contacts between the hub parts and the nut are so constructed that the rotative action in the direction for tightening the nut when the wheel is turning in the forward direction is made greatly to predominate over that acting in the opposite direction.

The invention further consists in permanently but rotatably mounting the hub nut on the detachable hub part.

The invention also consists in providing the hub parts on opposite sides of the vehicle with threads of different diameters and providing the hub nut with threaded surfaces to engage the threaded surfaces of each hub part.

In the accompanying drawings,

Figure 1 is a diagram illustrating the principle upon which the invention is based.

Fig. 2 is a plan of a motor vehicle to which this invention is applied in one of its forms, the vehicle being fitted with four detachable wheels and carrying a spare wheel part interchangeable with any of the four.

Fig. 3 shows one form of the invention in which the difference in size between the nut contacting surface is great, and Fig. 4 shows another form of the invention in which the threads of the hubs on one side are larger in diameter than those on the other.

In Fig. 1 the circles A—B represent two solids of revolution fitting the one within the other, the necessary clearance between the two being exaggerated for the sake of clearness. If these two bodies are pressed together in a vertical direction as indicated by the arrows C—D, and the one A is revolved in the direction of the arrow E, then the other B will be driven by it and will revolve as indicated by the arrow F, but at a higher speed of revolution in the ratio of the diameter A to the diameter B.

When applying the foregoing to a detachable wheel hub construction, the nut part which is provided with circumferential engaging surfaces forming solids of revolution has each pressed by the weight of the car tightly in contact with one of two other solids of revolution in the shape of the engaging surfaces of the inner and outer hub parts, the two former having of necessity the same angular velocity when revolving. The nut part will during joint revolution of the parts tend to move forward or backward relative to either one of the two hub parts according to whether it is in contact with an internally disposed or an externally disposed circumferential engaging surface thereof, so that if it engages a similarly disposed surface of each hub part its motion is the result of the sum of the frictional driving effect of both. If, on the other hand, a nut part is formed to be in contact with an externally disposed surface of one hub part and an internally disposed surface of the other then the two frictional driving effects will be opposed to one another and the motion of the nut part is the result of their difference. According to a third alternative, the frictional driving effect of one of the hub parts may be practically eliminated by arranging friction reducing means between its circumferential engaging surface and the corresponding engaging surface of the nut part.

The present application describes only cases of the second type in which the movement of the nut is the result of the difference of the two driving effects.

The nut c engages the threaded surface e of the inner hub part b and contacts with the internally coned surface d of the outer hub part a. When one hub part is eccentrically disposed relative to the other and, as pointed out above, the frictional driving effects of the hub parts are opposed to each other the contacting surface having the greater friction controls. This is, of course, the threaded surface and hence the inner hub controls. To insure the automatic tightening of the nut when the vehicle goes forward, the threads on the right hand inner hubs are left handed and the threads on the left hand inner hubs are right handed.

Even though there be considerable difference in size as in Fig. 3, where the nut c is screwed onto the threaded surface e of the inner hub part b and contacts with the internally coned surface d of the outer hub part a, the surface e predominates over the surface d.

According to a modification shown in Fig. 4 the nut, c, may be retained permanently and rotatably in connection with an internal conical surface of the outer hub part, a, by a collar v, engaging behind an internal shoulder of the hub part for this purpose. The nut in this case is provided with a portion f of a right hand screw, and a portion g of a left hand screw side by side and of different diameters so that the nut may engage a left hand thread h on the inner hub part, b, on the left hand side of the vehicle or a right hand thread k on the right hand side. In this case the large diameter internal thread must clear the small diameter external thread when pushed over it.

The last described modification or any type in which the nut accompanies the removable hub part might be constructed with one portion of thread only, instead of with two portions of opposite hand side by side. In such a case two separate types of removable hub parts are required, and one spare removable part is not applicable indiscriminately to either side of a vehicle.

By employing a nut part which is external to the predominating hub part engaging surface on one side of the vehicle, and one which is internal upon the other side the nuts employed may all be of the same handed thread, e. g. such that turning right-handedly will tighten and left-handedly will slacken the nut. By this means the possibility of attempting from ignorance to turn the nut in the wrong direction will be much reduced.

In such an arrangement the end of the outer hub parts may be formed with both internal and external contacting surfaces so as to be engageable by either type of nut.

It will be seen that by the use of this invention it can be arranged that a spare wheel part which is interchangeable with any of the like detachable wheel parts of a vehicle is automatically and safely retained in position as soon as the nut has been screwed up, and that no spring or hand-operated pawls or catches with the attendant ratchet teeth or castellations are necessary to prevent the nut from working loose, and as the tightening is automatic, there is no possibility of the outer hub part remaining loose upon the inner hub part through insufficient tightening of the nut and undue wear of the driving members is therefore avoided.

Further, any ordinary spanner of the correct size may be used for the nut and no special pawl-releasing devices are required.

The spanner may also be instantly applied to the nut for tightening or unscrewing without the previous manipulation of any catches or pawls.

It will be seen that the described modifications are merely examples of methods of carrying out the invention and that many other modifications may be employed.

Having now described my invention what I claim as new and desire to secure by Letters Patent is:—

1. In a vehicle, the combination of an axle, an inner hub part at each end thereof, said hub parts being externally threaded, the threads on the hub part at one end of the axle being of different diameter from those at the other, an outer hub part fitting over either inner hub part, and a nut rotatably mounted on said outer hub part to engage the threaded surface of either inner hub part and hold the outer hub part in position.

2. In a vehicle, the combination of an axle, an inner hub part at each end thereof, said hub parts being externally threaded, the threads on the hub part at one end of the axle being righthanded and those on the hub part at the other end being lefthanded, an outer hub part fitting over either inner hub part, and a nut, provided with internally threaded surfaces, to engage the threaded surfaces of either inner hub part and hold the outer hub part in position.

3. In a vehicle, the combination of an axle, an inner hub part at each end of said axle, an outer hub part fitting over either inner hub part, a nut permanently and rotatably mounted on said outer hub part, for holding said outer hub part in position, and means on said inner hub parts with which means on said nut engage, the means on one inner hub part differing in size from the means on the other inner hub part.

4. In a vehicle, the combination of an axle, an inner hub part at each end of said axle, righthand threads on one inner hub part and left hand threads on the other inner hub part, an outer hub part adapted to fit on either of said inner hub parts, and a nut, permanently and rotatably mounted in said outer hub part, said nut having right and left hand threads to engage with the threads on either inner hub part and hold the outer hub part in position.

In testimony whereof, I affix my signature in presence of two witnesses.

JOHN VERNON PUGH.

Witnesses:
ALBERT BROWN,
JOHN WM. ARKLE.